May 1, 1956  C. J. RAFFERTY  2,743,655

TRACTOR MOUNTED IMPLEMENT

Filed June 15, 1953  3 Sheets—Sheet 1

INVENTOR
CLARENCE J. RAFFERTY

Paul O. Pippel

ATTORNEY

INVENTOR
CLARENCE J. RAFFERTY

ATTORNEY

May 1, 1956 C. J. RAFFERTY 2,743,655
TRACTOR MOUNTED IMPLEMENT
Filed June 15, 1953 3 Sheets-Sheet 3

INVENTOR
CLARENCE J. RAFFERTY
Paul O. Pippel
ATTORNEY

United States Patent Office 2,743,655
Patented May 1, 1956

2,743,655

TRACTOR MOUNTED IMPLEMENT

Clarence J. Rafferty, Memphis, Tenn., assignor to International Harvester Company, a corporation of New Jersey Application June 15, 1953, Serial No. 361,469

7 Claims. (Cl. 97—47.22)

This invention relates to tractor mounted implements and is concerned particularly with the type of tractor mounted implement which is adapted to be pushed rather than drawn by the tractor.

An object of the invention is the provision of an improved agricultural implement.

Another object of the invention is the provision of a novel agricultural implement adapted to be mounted upon a tractor and to be gauged thereby.

Another object of the invention is the provision of an improved agricultural implement adapted to be mounted on the side of a tractor, and particularly concerns the mechanism by which the implement is attached to the tractor and stabilized therefrom.

A further object of the invention is the provision of an improved tractor mounted implement connected to the tractor by parallel linkage which accommodates vertical floating movement of the implement and wherein the implement is stabilized by another pair of parallel links also connected between the tractor and the implement.

Other objects and advantages of the invention will become clear from the following detailed description when read in conjunction with the accompanying drawings, wherein.

Figure 1:
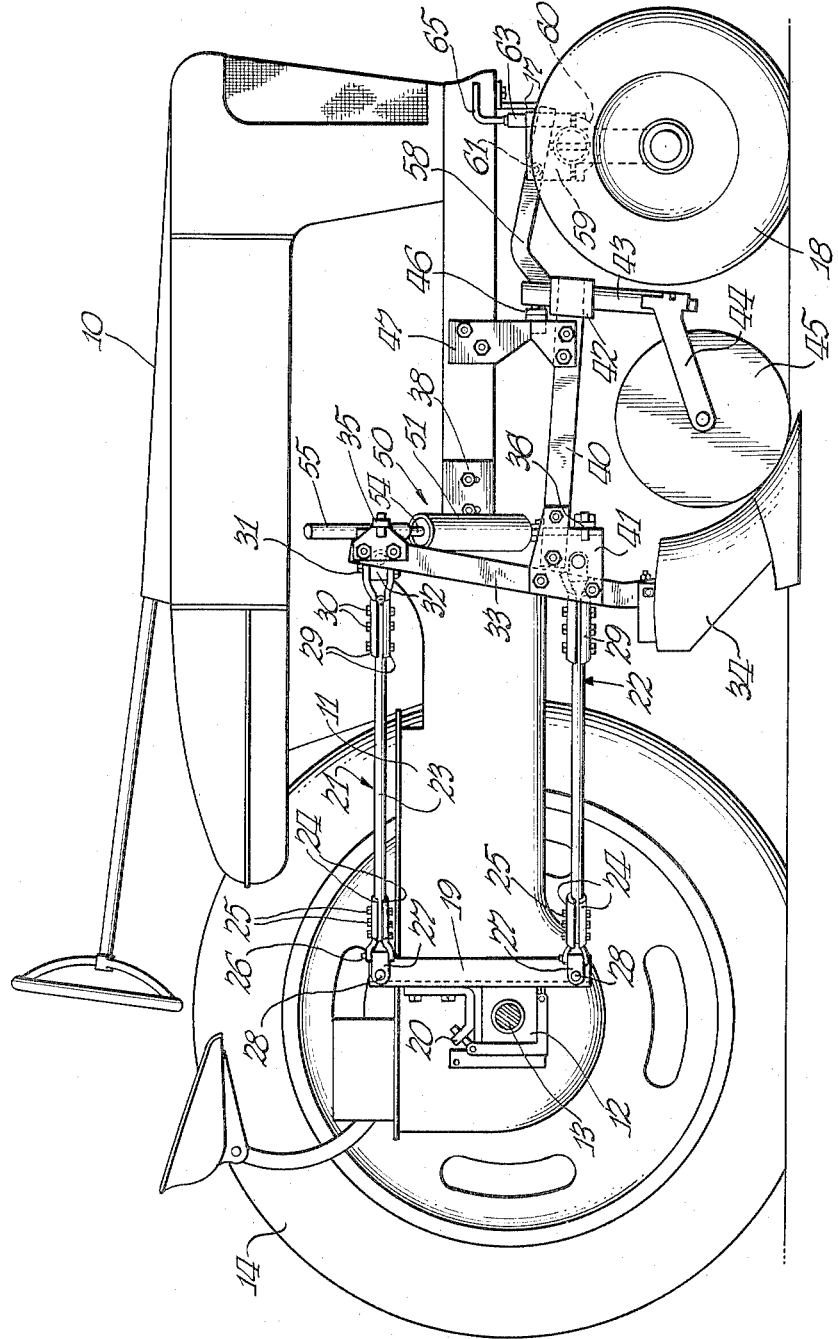
Figure 1 is a view in side elevation of a tractor having mounted thereupon an agricultural implement incorporating the features of this invention.

Referring to the drawings, it will be observed that the numeral 10 designates the longitudinally extending body of a tractor having a power plant 11 and a transverse rear axle structure 12 rotatably carrying an axle 13 upon which are mounted rear drive wheels 14.

The front end of the tractor is supported in a manner well known in the art upon a transverse axle structure 15 which is capable of pivoting in a vertical plane about a pivotal connection 16 to the front bolster 17 of the tractor. The front axle structure 15 supports at its end depending stub axles, not shown, supporting dirigible front wheels 18.

A portion of the rear axle structure 12 projects from opposite sides of the tractor body and each is provided with an implement attaching bracket 19 removably secured to the rear axle structure by clamping mechanism 20. Bracket 19 extends vertically and has pivotally connected thereto at vertically spaced locations a pair of generally parallel links 21 and 22. Link 21 comprises a tubular member 23 having at its rear end a pair of straps 24 adjustably secured to the end of the member 23 by a plurality of bolts 25. The ends of the straps 24 projecting beyond the end of the member 23 are apertured to receive a pivot pin 26 pivotally mounted in an opening in a clevis 27 which, in turn, is pivotally connected by a pin 28 to the bracket 19. Since the pin 26 extends vertically and the pin 28 horizontally, the upper link 21 is capable of vertical and lateral pivotal movement relative to the bracket 19. The lower link 22 is similarly connected to the bracket 19.

The forward end of link 21 is provided with another pair of straps 29 also secured to the member 23 by a plurality of bolts 30 receivable in registering openings in the link accommodating longitudinal adjustment of the straps 29 relative to the member 23. The forward ends of the straps 29 are apertured to receive a pivot pin 31 mounted in a pivot member 32 pivotally connected for vertical swinging movement relative thereto, to a vertically extending tool supporting standard 33 having mounted at its lower end an earth-working tool in the form of a middle buster 34. The forward end of link 21 thus is capable of vertical as well as horizontal pivotal movement relative to the standard 33. The lower link 22 is similarly pivotally connected to the standard 33.

Figure 2:
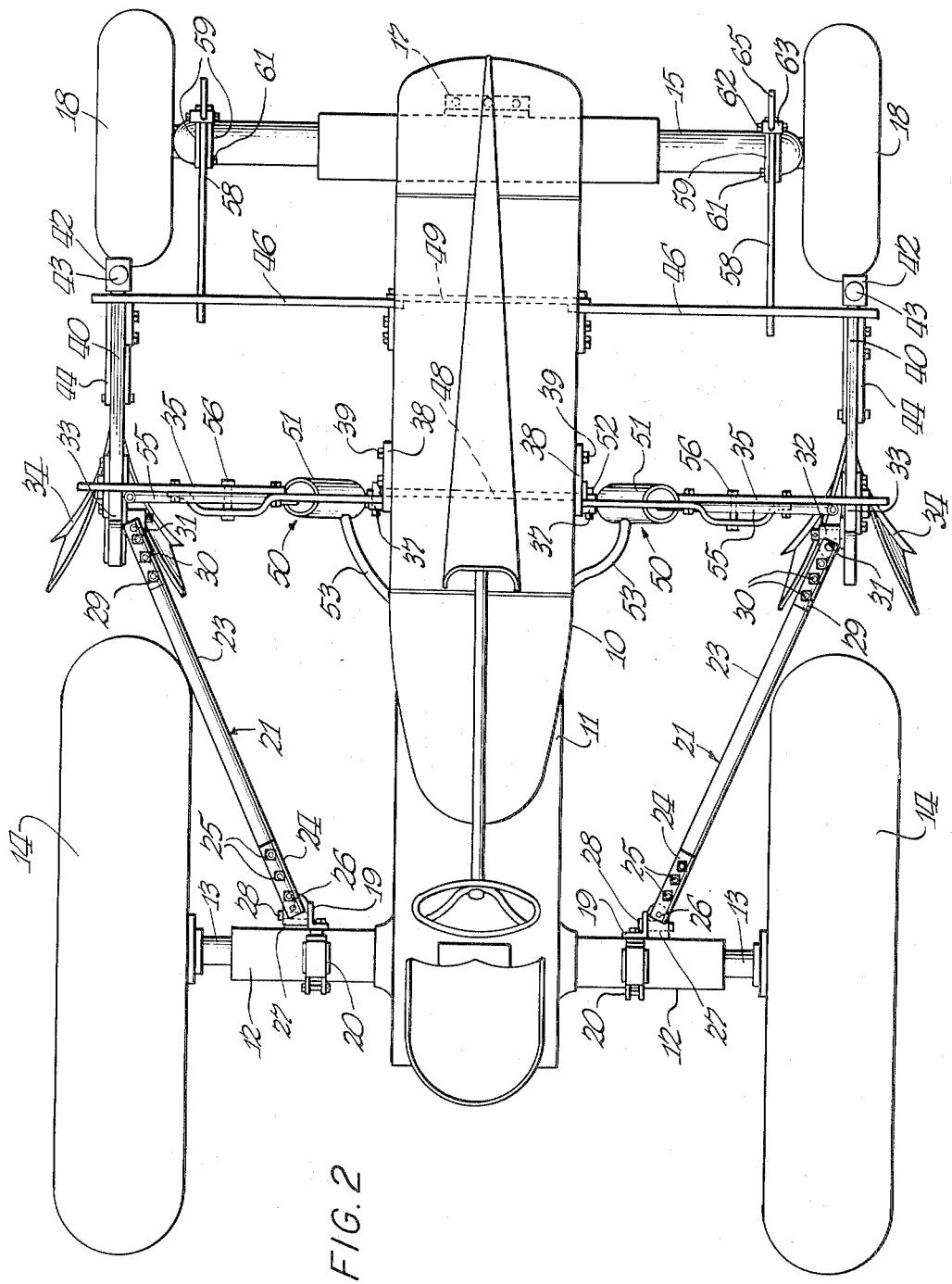
Figure 2 is a plan view of the structure shown in Figure 1.

As is clear from Figure 2, a pair of parallel links 21 and 22 and a middle buster unit 34 are mounted on each side of the tractor body and the middle buster units are pushed rather than pulled by the tractor. However, since the units at opposite sides of the tractor body are substantial duplicates a description of one suffices for both. It will also be observed from Figure 2 that the links 21 and 22 extend forwardly and laterally at an angle from the rear axle structure 12 to a position with the earth-working tool 34 between the front and rear wheels 18 and 14 on opposite sides of the tractor body. At this point it should be clear that the tool support 33 with its earth-working tool 34 thereon is capable of vertical floating movement relative to the tractor about the pivots of the links 21 and 22 on the bracket 19. Providing additional support for stabilizing, and guiding the middle buster 34 and its standard 33 in its vertical movement relative to the tractor is a pair of vertically spaced generally parallel links 35 and 36, pivotally connected at their inner ends to a bracket 37 affixed to a plate 38 secured to the side of the tractor body by one or more bolts 39. The outer end of each of the links 35 and 36 is pivotally connected at vertically spaced locations to the tool supporting standard 33. The earth-working implement is thus capable of vertical floating movement and is held against lateral tilting about a longitudinal axis by the links 35 and 36 while being confined to movement in a substantially straight path. The connections of links 35 and 36 to bracket 37 and to standard 33 are sufficiently loose to accommodate some swinging of the links about both horizontal and vertical axes inasmuch as standard 33 moves longitudinally during vertical movement of links 21 and 22.

Also forming a part of the tool supporting structure is a forwardly extending beam 40 affixed to a plate 41 secured to the standard 33. The forward end of the beam 40 carries a bearing member 42 which rotatably supports an axle 43 having a lower angled portion 44 upon which is mounted a colter 45. A transversely extending link 46 is pivotally connected at one end to the beam 40 and at its other end to a plate 47 secured to the side of the tractor body. The lower links 36 on each side of the tractor body are connected by a bracing strap 48 which extends under the tractor body and the supporting links 46 at each side of the tractor body are connected by a bracing strap 49 also extending under the tractor body.

Vertical movement of the earth-working tool between operating and transport positions is accomplished by power lift mechanism including a ram unit 50. A ram unit 50 is provided at each side of the tractor body and is operated by fluid under pressure from a source not shown, mounted on the tractor and delivered to the ram unit under pressure by power derived in any suitable manner from the tractor power plant. The ram unit comprises a cylinder 51 pivotally mounted upon a lug 52 affixed to the bracket 37 and receives fluid under pressure through a hose line 53. A piston rod 54 actuated by the fluid under pressure is slidably receivable in a sleeve member 55 having a closed end and pivotally mounted upon a pin 56 carried by the upper link 35. The piston rod 54 engages the end of the sleeve 55 and by extension thereof in the cylinder the implement is raised to an inoperative or transport position.

In order that the lateral position of the middle buster units 34 may be adjusted, the links 35 and 36 are provided, respectively, with a plurality of openings 56' and 57, any of which may serve for the pivotal connection of the associated link to the standard 33. Adjustment of the position of the standard 33 relative to the links 35 and 36 likewise necessitates adjustment in the length of the links 21 and 22 and this is accomplished by the provision of the bolts 25 and 30 and suitable openings in the member 23 for the reception thereof at such locations as are required to lengthen or shorten the links 21 and 22.

Gauging of the depth of operation of the middle buster unit 34 is accomplished by mechanism including a longitudinally extending bar 58, the forward end of which is received between a pair of plates 59 removably secured by a clamp 60 to the front axle housing 15 of the tractor, and is pivotally mounted upon a bolt 61 between the plates 59. The plates 59 are connected by one or more bolts 62 and a yoke 63 straddles the plates and is mounted upon the forward bolt 62. The threaded shank 64 of a crank 65 is slidably received in an aperture provided in the yoke 63 and is threaded into a block 66 also straddled by the yoke. The lower end of the threaded shank 64 engages the forward end of the bar 58 projecting beyond the pivot bolt 61 and functions to pivot the bar 58 about its axis and raise or lower the rear end thereof.

Figures 3, 4:
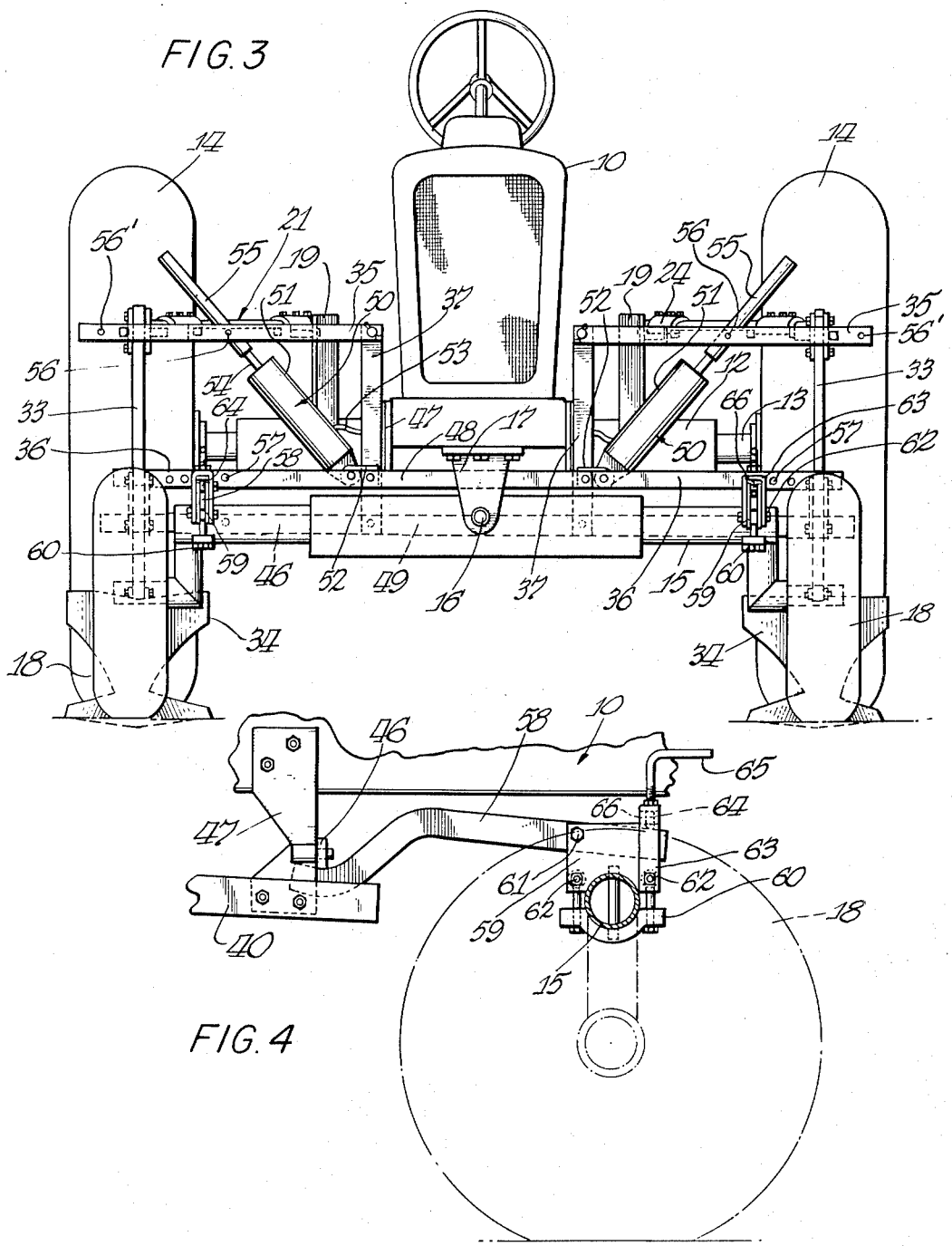
Figure 3 is a front elevation of the tractor showing the implement incorporating the features of this invention mounted thereon.
Figure 4 is an enlarged detail of the mechanism by which the operation of the implement is gauged and its depth regulated.

The rear end of bar 58, as is clearly shown in Figure 4, is curved downwardly and rearwardly and its upper edge forms an abutment which engages the lower edge of the transverse connecting link 46, thus supporting the forward end of the implement. Since the forward end of the implement is supported by the bar 58, which is mounted upon the front axle structure of the tractor, it should be clear that the depth of operation of each middle buster 34 is gauged by the associated tractor front wheel 18, an appropriate connecting link 46 and supporting bar 58 being provided for the implement section at each side of the tractor body.

The operation of the tractor mounted agricultural implement of this invention should be clearly understood from the foregoing description. It should likewise be understood, however, that the invention has been described in its preferred embodiment and that modifications may be made therein without departing from the spirit of the invention or the scope of the appended claims.

What is claimed is:

1. In a push type implement adapted for mounting upon a tractor having a longitudinally extending body, dirigible front wheels, a transverse rear axle structure and spaced rear drive wheels, a first pair of vertically spaced generally parallel links pivotally connected to the rear axle structure and extending forwardly therefrom at the side of the tractor body, a vertically extending tool support having a tool at its lower end and to which the forward end of each of said links is pivotally connected, and a second pair of generally parallel links extending laterally from the tractor, said second pair of links being pivotally connected at vertically spaced locations to the tractor and to the tool support for swinging about horizontal and vertical axes to cause the tool support to remain in a vertical position and to stabilize said support against tilting about a longitudinal axis during vertical movement thereof.

2. The invention set forth in claim 1, wherein the second pair of links is pivotally connected at vertically spaced locations to a bracket removably secured to the side of the tractor body, whereby said second pair of links may be detached from the tractor as a unit.

3. In an implement adapted for mounting upon a tractor having a longitudinally extending body, a transverse rear axle structure with drive wheels, and a source of fluid pressure deriving power from the tractor, a first pair of vertically spaced generally parallel links pivotally connected to the rear axle structure and extending forwardly therefrom at the side of the tractor body, a tool support to which the forward ends of said links are pivotally connected, a vertically extending bracket removably mounted on the side of the tractor, a second pair of vertically spaced generally parallel links extending laterally from the tractor, said second links being pivotally connected at their inner ends to the bracket and at their outer ends to the tool support, and a hydraulic cylinder pivotally mounted on said bracket and operatively connected to said source of fluid pressure to derive power therefrom, the piston in said cylinder being pivotally connected to one of said second pair of links for vertically moving the tool support about the pivots of said first and second links on the tractor.

4. The invention set forth in claim 3, wherein an elongated sleeve member is pivotally mounted on the upper of said second pair of links and the cylinder is removably connected to the bracket and has a piston rod slidably receivable in said sleeve.

5. In an implement adapted for mounting upon a tractor having a longitudinally extending body and front and rear axle structures projecting laterally from the tractor body, and having wheels thereon, a tool carrier having an earth-working tool thereon, vertically spaced generally parallel links pivotally mounted on the rear axle structure at one side of the tractor body extending forwardly therefrom and pivotally connected to said carrier to accommodate lateral swinging and vertical floating movement thereof relative to the tractor, vertically spaced generally parallel links pivotally connected to the tractor body extending laterally therefrom and operatively pivotally connected to said tool carrier to accommodate said floating movement thereof, the pivotal connections of said last mentioned links to the tractor body and to the tool carrier being such as to accommodate swinging of said links about both vertical and horizontal axes, a brace member operatively connected to said tool carrier, and a rigid member secured to said front axle independently of and engageable with said brace member to limit the downward movement of said tool carrier relative to the tractor.

6. The invention set forth in claim 5, wherein said rigid member extends rearwardly from the front axle structure at the side of the tractor for engagement with said brace member to limit downward movement of the carrier relative to the tractor.

7. The invention set forth in claim 9, wherein said rigid member is engageable with the under side of said linkage and the forward end thereof is adjustably mounted on the front axle structure for vertical adjustment of the rear end thereof.

References Cited in the file of this patent

UNITED STATES PATENTS

| | | |
|---|---|---|
| 1,492,791 | Goldsmith | May 6, 1924 |
| 1,542,094 | Raymond | June 16, 1925 |
| 1,614,673 | Hester | Jan. 18, 1927 |
| 1,861,134 | Rich et al. | May 31, 1932 |
| 1,901,684 | White et al. | Mar. 14, 1933 |
| 1,915,355 | Court et al. | June 27, 1933 |
| 2,349,343 | Graham | May 23, 1944 |
| 2,445,145 | Love | July 13, 1948 |
| 2,569,389 | Seaholm | Sept. 25, 1951 |